United States Patent [19]
Kametani

[11] Patent Number: 5,367,662
[45] Date of Patent: Nov. 22, 1994

[54] DISTRIBUTED MACHINE STATE CONTROLLED PROCESSOR SYSTEM WITH A CPU CLOCKED WITH A REFERENCE SIGNAL DELAYED FROM A SYSTEM CLOCK

[75] Inventor: Masatsugu Kametani, Ibaraki, Japan

[73] Assignee: Hitachi, Ltd., Tokyo, Japan

[21] Appl. No.: 59,731

[22] Filed: May 11, 1993

Related U.S. Application Data

[63] Continuation of Ser. No. 406,562, Sep. 13, 1989, abandoned.

[30] Foreign Application Priority Data

Sep. 16, 1988 [JP] Japan .................. 63-230007

[51] Int. Cl.$^5$ .......................... G06F 1/04; G06F 1/10
[52] U.S. Cl. ............................ 395/550; 364/DIG. 2; 364/950; 364/950.3; 364/950.4
[58] Field of Search ............... 395/275, 425, 550, 725, 395/775

[56] References Cited

U.S. PATENT DOCUMENTS

| | | | |
|---|---|---|---|
| 3,577,128 | 5/1971 | Crisimagna et al. | 364/200 |
| 3,774,157 | 11/1973 | Tsui | 364/200 |
| 4,063,308 | 12/1977 | Collins et al. | 364/200 |
| 4,095,267 | 6/1978 | Morimoto | 364/200 |
| 4,223,392 | 9/1980 | Lemaire et al. | 364/900 |
| 4,229,791 | 10/1980 | Levy et al. | 364/200 |
| 4,419,739 | 12/1983 | Blum | 364/900 |
| 4,503,490 | 3/1985 | Thompson | 364/200 |
| 4,802,120 | 1/1989 | McCoy | 395/550 |
| 4,835,728 | 5/1989 | Si et al. | 364/900 |
| 4,989,175 | 1/1991 | Boris et al. | 364/900 |
| 5,097,437 | 3/1992 | Larson | 395/775 |

OTHER PUBLICATIONS

Intel Microprocessor and Peripheral Hand Book, vol. I 1987, 3–34 to 3–35.

Primary Examiner—Paul V. Kulik
Assistant Examiner—John C. Loomis
Attorney, Agent, or Firm—Antonelli, Terry, Stout & Kraus

[57] ABSTRACT

A controller (MSC) for generating a basic control signal to permit a CPU to access to a resource in a processor system is arranged in each of local control blocks. The MSC is operated not by a basic clock supplied to the CPU but by a clock which is generated prior to the clock supplied to the CPU and which passes through the MSC and is precisely controlled for delay. Thus, the delay of a control signal to be supplied to the CPU relative to the reference clock is minimized and a high speed operation of the system is attained.

18 Claims, 9 Drawing Sheets

FIG. 5
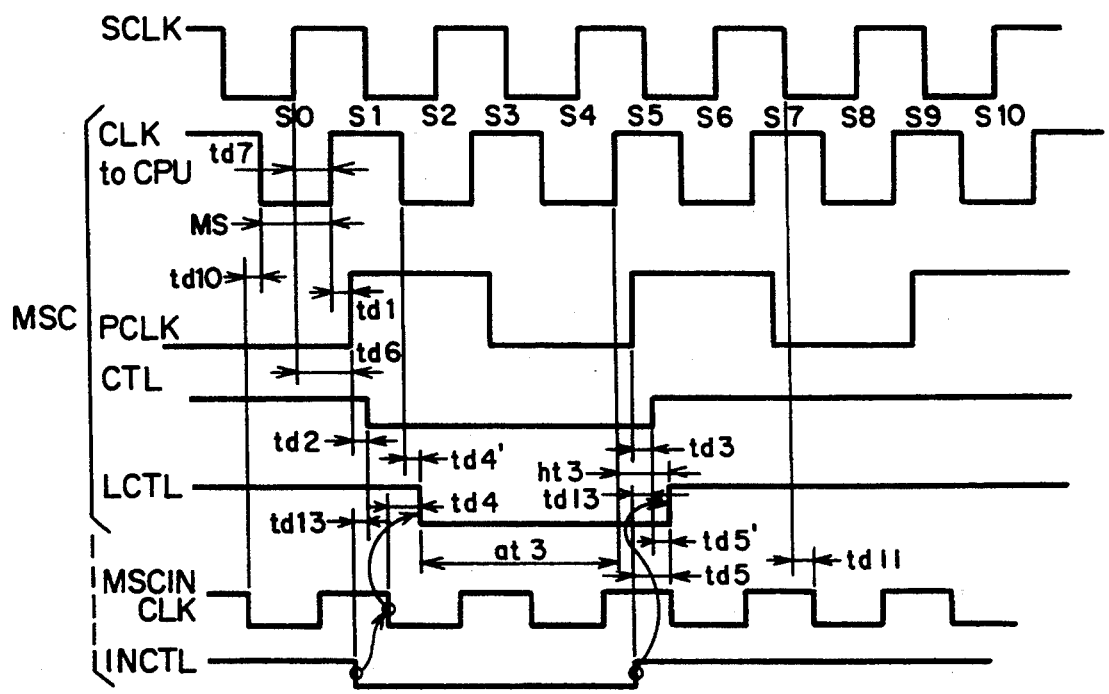
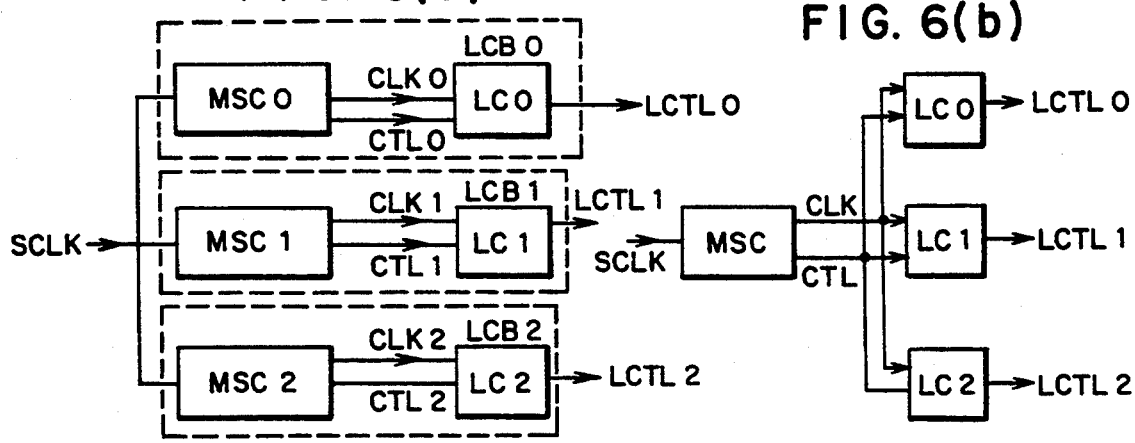

FIG. 12

|  | min | typ | max |
|---|---|---|---|
| (a) DELAY OF CLK RELATIVE TO SCLK | 2.14 ns | 3 ns | 4.2 ns |
| (b) DELAY OF SIGNAL RELATIVE TO SCLK | 4.28 ns | 6 ns | 8.4 ns |
| (c) DELAY OF SIGNAL RELATIVE TO CLK | 0.08 ns | 3 ns | 6.26 ns |

☆ 5.0V, 25°C, 30pF LOAD, VARIATION 40%

FIG. 13

|  | min | typ | max |
|---|---|---|---|
| (a) DELAY OF CLK RELATIVE TO SCLK | 2.4 ns | 3.36 ns | 4.7 ns |
| (b) DELAY OF SIGNAL RELATIVE TO SCLK | 4.79 ns | 6.72 ns | 9.4 ns |
| (c) DELAY OF SIGNAL RELATIVE TO CLK | 0.09 ns | 3.36 ns | 7 ns |

☆ 4.8V, 55°C, 30pF LOAD, VARIATION 40%

FIG. 14

|  | min | typ | max |
|---|---|---|---|
| (a) DELAY OF CLK RELATIVE TO SCLK | 2.92 ns | 3.36 ns | 3.86 ns |
| (b) DELAY OF SIGNAL RELATIVE TO SCLK | 5.84 ns | 6.72 ns | 7.73 ns |
| (c) DELAY OF SIGNAL RELATIVE TO CLK | 1.51 ns | 3.36 ns | 4.81 ns |

☆ 4.8V, 55°C, 30pF LOAD, VARIATION 15%

FIG. 15

|  | min | typ | max |
|---|---|---|---|
| (a) DELAY OF CLK RELATIVE TO SCLK | 2.92 ns | 3.36 ns | 3.86 ns |
| (b) DELAY OF SIGNAL RELATIVE TO SCLK | 5.84 ns | 6.72 ns | 7.73 ns |
| (c) DELAY OF SIGNAL RELATIVE TO CLK | 1.98 ns | 3.36 ns | 4.37 ns |

☆ 4.8V, 55°C, 30pF LOAD, VARIATION 15%,
IC FOR GENERATING CLK INCLUDES STANDARD DELAY

FIG. 16

|  | min | typ | max |
|---|---|---|---|
| (a) DELAY OF CLK RELATIVE TO SCLK | 4.38ns | 5.04ns | 5.80ns |
| (b) DELAY OF SIGNAL RELATIVE TO SCLK | 5.84ns | 6.72ns | 7.73ns |
| (c) DELAY OF SIGNAL RELATIVE TO CLK | 0.04ns | 1.68ns | 3.35ns |

☆ 4.8V, 55°C, 30pF LOAD, VARIATION 15%

FIG. 17

|  | min | typ | max |
|---|---|---|---|
| (c) DELAY OF SIGNAL RELATIVE TO CLK | 4.79ns | 6.72ns | 9.4ns |

☆ 4.8V, 55°C, 30pF LOAD, VARIATION 40%

FIG. 18

|  | min | typ | max |
|---|---|---|---|
| (d) DELAY OF SIGNAL RELATIVE TO CLK | 5.84ns | 6.72ns | 7.73ns |

☆ 4.8V, 55°C, 30pF LOAD, VARIATION 15%

DISTRIBUTED MACHINE STATE CONTROLLED PROCESSOR SYSTEM WITH A CPU CLOCKED WITH A REFERENCE SIGNAL DELAYED FROM A SYSTEM CLOCK

This application is a continuation of U.S. application Ser. NO. 07/406,562, filed Sep. 13, 1989, now abandoned.

BACKGROUND OF THE INVENTION

1. Field of the Invention

The present invention relates to a computer system, and more particularly to a control system for a peripheral circuit suitable for reducing the machine cycle or bus cycle of the operation.

2. Related Background Art

In a prior art computer system, a peripheral circuit of a CPU is controlled, by sending a control signal necessary to the peripheral system by way of a peripheral control circuit or bus controller, which operates in synchronism with the CPU in response to a basic clock supplied to the CPU, for carrying out necessary operations (for example, generation of an access signal to a memory or I/O) by the peripheral system by making use of the control signal to attain exchange of data between the CPU and the memory or the I/O. Several bus controllers of different functions may be used, but usually one bus controller controls many units in the system.

As an example of such systems, a system is shown in FIGS. 31 and 32 of Intel Microprocessor and Peripheral Handbook, 3-34 and 3-35, Vol. 1-Microprocessor, Document No. ISBNI-55512-062-8. FIG. 31 thereof shows a basic system comprising one bus controller and one CPU and having a local bus. A clock (CLK) which provides a reference for system operation is generated by a clock generator and it is directly supplied to both the bus controller and the CPU. FIG. 32 thereof shows a system configuration for a special case where a multi-bus, which is a system bus, is to be controlled. It has basically the same configuration as that of FIG. 31 except for the addition of a bus arbiter which generates a signal required by the multi-bus. The CLK signal from the clock generator is also directly supplied to the bus arbiter. The bus arbiter generates a signal to control the bus controller (for example, AEN signal) and it is serially supplied to the bus controller. In any basic system, a sub-control system in the system and sub-systems on the bus are controlled by using the control signal of the control system.

As an alternative system configuration, FIGS. 31 and 32 of the above reference are combined to include both local bus and system bus a and distributed bus control systems are provided to control the local bus and the system bus, respectively. In this case, the control of the respective buses is carried out through the respective bus control systems.

In the prior art system, a synchronization signal to the peripheral control circuit and the bus controller is usually the same as (or equivalent to) the clock supplied to the CPU and it is not of advanced phase (signal transition occurs at an earlier time). Accordingly, the control signal outputs from the peripheral control circuit and the bus controller are delayed by the time required to pass through the peripheral circuit and the bus controller, relative to the reference clock supplied to the CPU. Therefore, in the peripheral system which uses such control signal, a further delay time (gate delay or delay due to the machine cycle) is included in the course of generating the access signal to the memory. As a result, a high speed machine cycle or bus cycle cannot be attained. Further, in a system in which one peripheral control circuit or bus controller controls the peripheral system, a signal load is so heavy that the signals are delayed, or signal lines are so long that the system is not electrically stable.

SUMMARY OF THE INVENTION

It is an object of the present invention to reduce a machine cycle or bus cycle of a computer system in order to attain speed-up of the system.

The above object is achieved in a processor system comprising a CPU, a sub-system to be accessed by the CPU, a signal controller for controlling access to the sub-system, and a machine state controller for supplying a reference control signal corresponding to a state of the CPU to the signal controller, by supplying to the machine state controller a system clock which is a reference in generating the reference control signal, and generating in parallel a reference clock which is a reference of operation of the CPU by using the system clock and the reference control signal other than the reference clock in the machine state controller, wherein the reference clock and the reference control signal have an appropriate relative phase relationship therebetween.

According to the present system, the clock to be supplied to the CPU which is the reference clock includes a time delay for passing through an IC, relative to the system clock SCLK, and the control signal generated by the peripheral control circuit or bus controller also include an equivalent time delay. Therefore, the clock and the control signal are adjusted in the IC so that there is no conflict in the phase relationship (this may be attained because gate delays in the IC are substantially uniform). Thus, the delay time of the control signal relative to the clock supplied to the CPU can be reduced. Namely, timing may be gained by cancelling out an appropriate time for passing through the IC. Further, by arranging the peripheral control circuit or the bus controller which is controlled in this manner in each local controller, critical wiring can be shortened and a load can be distributed. As a result, a sufficient drive capability is assured for a capacitive load. Accordingly, the signal is stabilized and the delay time of the signal is further reduced. By incorporating a separate control circuit for the local controller in each peripheral control circuit IC, the signal for controlling the peripheral system (memory and I/O system) can be directly generated in the IC's by making use of the advanced phase control signals and high speed gate logics in the IC's. Accordingly, the access time of the CPU to the sub-system is reduced.

BRIEF DESCRIPTION OF THE DRAWINGS

FIG. 5 illustrates generation function of a control signal in another embodiment of the present invention, FIG. 6(a) shows a system configuration of a distributed machine controller of the present invention, FIG. 6(b) shows a system having a common machine controller, FIGS. 12, 13, 14, 15 and 16 show comparisons of performances between the present invention and the prior art, FIGS. 17 and 18 illustrate performances of the prior art.

DESCRIPTION OF THE PREFERRED EMBODIMENTS

One embodiment of the present invention is now explained with reference to FIGS. 1–7.

Figure 1:
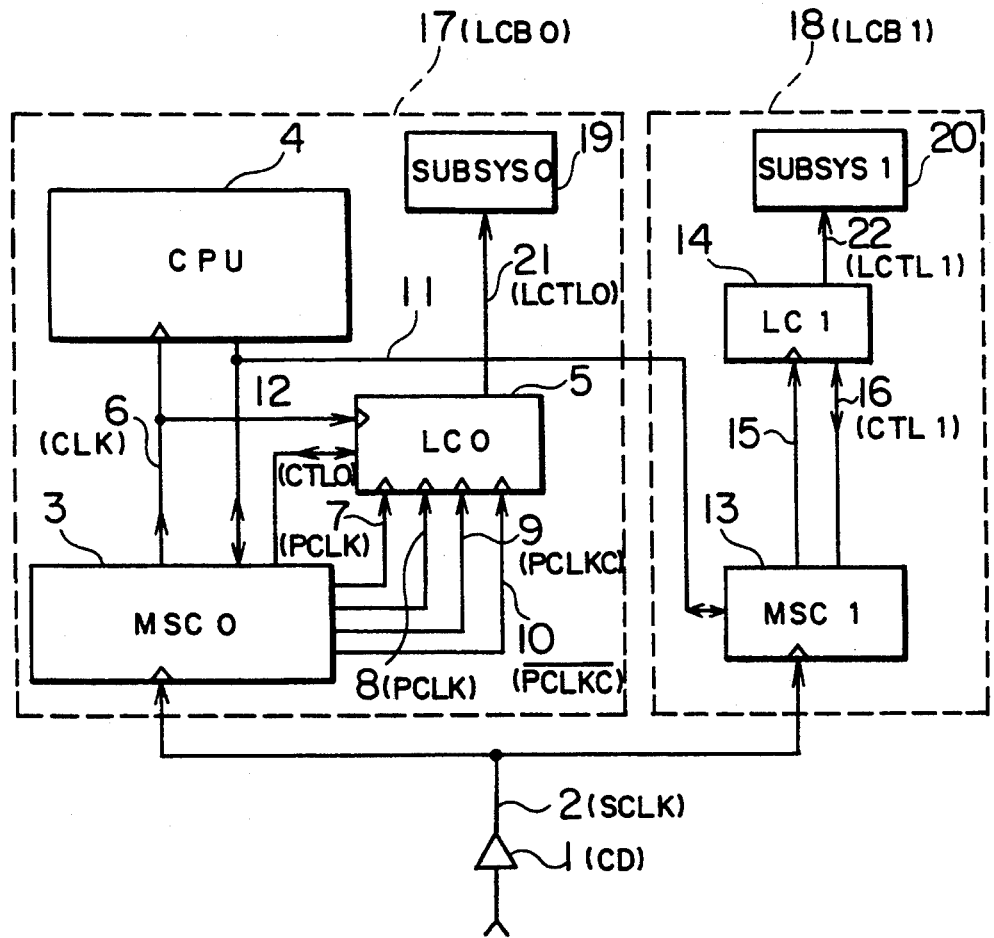
FIG. 1 shows a block diagram of a processor system of the present invention.

FIG. 1 shows a block diagram of the present invention. It comprises two local control blocks (LCB's) 17 and 18. The local control block (LCB0) 17 has a machine state controller (MSC0) 3, a central processing unit (CPU) 4 and a local controller (LC0) 5 which generates a signal to control the access from the CPU to a sub-system (SUBSYS0). On the other hand, the other local control block (LCB1) 18 has another machine state controller (MSC1) 13 and a local controller (LC1) 14 which generates a signal (LCTL1) 22 to control the access from the CPU to a sub-system (SUBSYS1). Data bases, address buses and control buses for exchanging information between the CPU and the sub-system are omitted in the drawing but they are actually connected to the sub-systems 19 and 20 directly or through a bus buffer. A control signal 11 from the CPU is supplied to the machine state controllers 3 and 13. A clock (SCLK) 2 which is a reference to the operation of the machine state controllers is not in phase with the clock supplied to the CPU but it is advanced relative to the clock supplied to the CPU. It is driven by a clock driver 1 and supplied to the two machine state controllers 3 and 13. A reference clock (CLK) 6 which is supplied to the CPU and used for the control is generated by the machine state controller (MSC0) 3 and the delay thereof relative to the clock (SCLK) is precisely controlled. Since a reference of the AC timing in the system depends on the operation timing of the CPU, the clock (CLK) 6 is important as the reference clock of the system control. All AC timings such as generation timing of the signal supplied from the CPU and input timing of information to the CPU are defined by the clock (CLK) 6. The machine state controller (MSC0) 3 further exchanges a necessary control signal (CTL0) 12 with the local controller (LC0) 5 and supplies necessary reference signals 7, 8, 9, 10 (7-PCLK, 8-PCLK, 9-PCLKC, 10-PCLKC) to the local controller (LC 0) 5. On the other hand, in the local control block (LCB 1) 18, the machine state controller (MSC 1) 13 independently exchanges necessary control signal (CTL 1) 16 with the local controller (LC 1) and supplies necessary reference signal 15 to the local controller (LC 1) 16. Where the reference of signals are to be strictly controlled, the machine state controller (MSC) in one of the local control blocks is used as a reference and sends a portion of the reference signals (CLK, PCLK) and the control signal (CTL) to the other local control block (LCB) for use in the local controller (LC) of the other local control block (LCB).

The advantages and features of the present invention are compared with those of prior art system.

Figure 2:
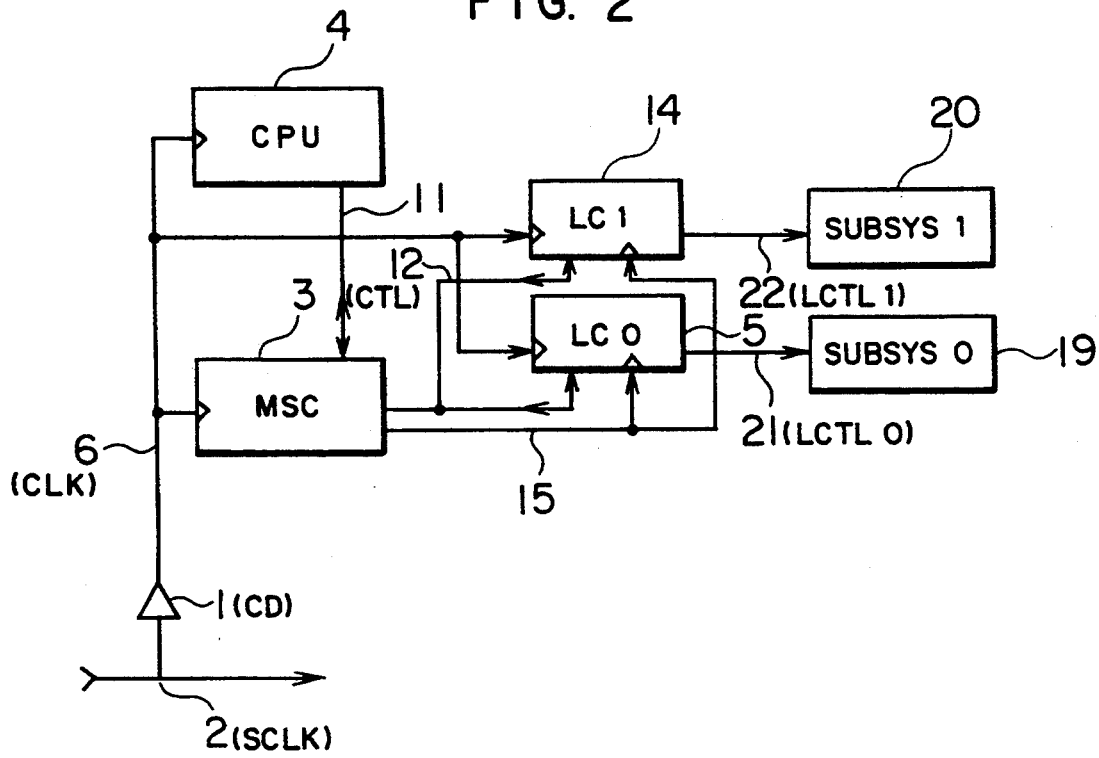
FIG. 2 shows a configuration of a prior art controller.

FIG. 2 shows a configuration of a prior peripheral controller around a CPU 4 having the same system function as that of FIG. 1. The clock (CLK) 6 is directly driven by the clock driver 1 and it is supplied to the CPU 4 and the machine state controller (MSC) 3. The machine state controller (MSC) 3 exchanges necessary control signal 11 with the CPU 4 and generates the control signal (CTL) 12 necessary to control the peripheral system and the reference signal 15 by using the control signal 11 and the reference clock (CLK) 6. Each of the local controllers (LC) 5 and 14 exchanges necessary basic control signal (CTL) 12 with the machine state controller (MSC) 3 and in order to generate a signal (LCTL) 21 or 22 necessary to control the associated sub-system (SUBSYS) 19 or 20. Usually, one machine controller (MSC) 3 is provided and it supplies the control signals (CTL) necessary to all local controllers (LC) in the system.

Figure 3:
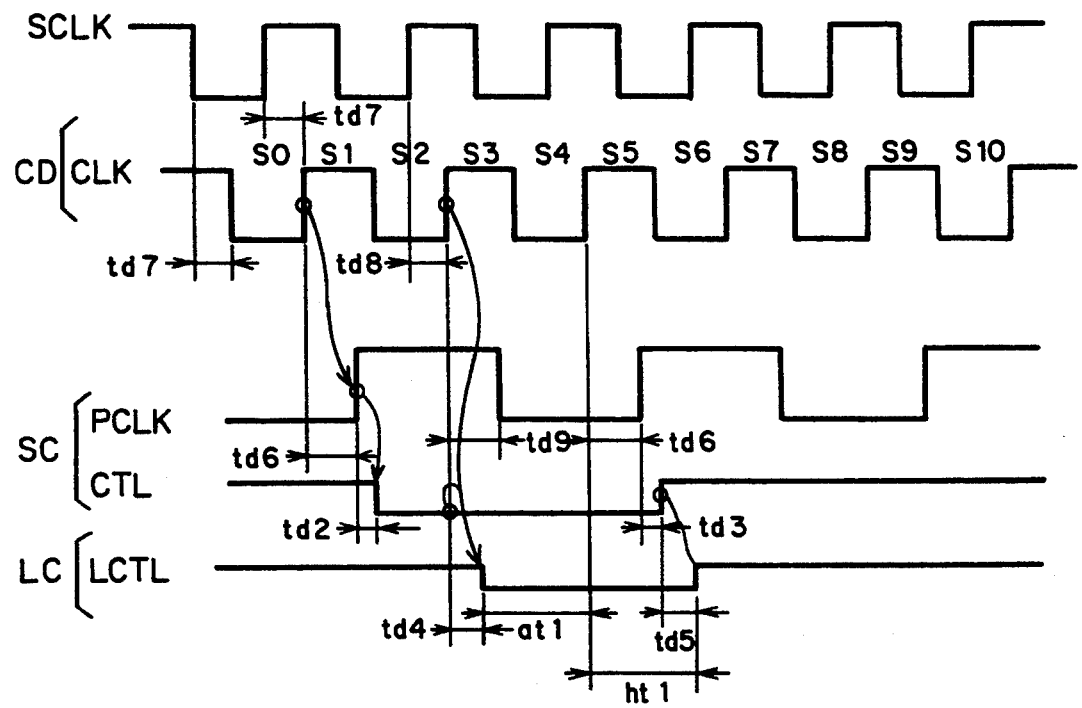
FIG. 3 illustrates generation function of a control signal in the prior art system.

FIG. 3 shows a generation timing of the reference signal and the control signal in the prior system shown in FIG. 2. The system clock (SCLK) is delayed by a pass-through delay time td 7 of the driver 1 (which includes a delay on the line. Hereinafter, the term delay includes the delay on the line) to produce the reference clock (CLK) 6. The machine state controller (MSC) 3 generates the PCLK signal which is one of the reference signals, at the rise of state 0 (S0) and also uses the PCLK signal in the machine state controller (MSC) 3 before it is outputted from the machine state controller (MSC) 3. The control signal (CTL) is caused to fall at the rise of the internal PCLK signal in state 1 (S1). The delay time of the control signal (CTL) relative to the PCLK signal is td 2. A total time from the rise of the state 0 (S0) to the output of the control signal (CTL) from the machine state controller (MSC) 3 is td 6+td 2. Where it is necessary to use the clock (CLK) for synchronization in order to generate the local control signal (LCTL) necessary for the local controller (LC) to control the sub-system (SUBSYS), a sufficient set-up time for latching may not be available because the time td 6+td 2 is close to or longer than the period of the state. FIG. 3 shows an example thereof. Since the local controller (LC) cannot latch the control signal (CTL) at the fall of the state 1 (S1), it latches at the rise of the state 2 to generate the local control signal (LCTL) (active L0). The local control signal (LCTL) falls with the delay of td 4 from the rise of the state 2 (S2). At that timing, the sub-system is accessed to input data into the CPU 4. Assuming that the CPU 4 reads in the data into the CPU 4 at the rise of the state 4 (S4), the local control signal (LCTL) rises to the high level (non-active) as soon as the control signal (CTL) which is produced by the machine controller (MSC) 3 rises (non-active) during the access time after the local control signal (LCTL) has turned to the active (L0) state. The timing at which the control signal (CTL) rises is delayed by td 3 from the rise of the PCLK which is the reference signal at the state 5 (S5). Since the timing at which the local control signal (LCTL) rises in response to the control signal (CTL) is delayed by td 5, there is a total delay time of ht 1 (td 6+td 3+td 5) measured from the reference clock (CLK) 6. If it is too long, a time to permit the start of the next access cycle is delayed. In the example shown in FIG. 3, it is delayed up to the state 7 (S7).

The prior system has thus been described. If the access time dt 1 is too short, the access to the sub-system (SUBSYS) may not be done in time and an extra wait state must be inserted in the CPU 4. If the hold time ht 1 is too long, it is not possible to increase the number of times of access in a unit time. Those will lower the data transfer throughput between the CPU 4 and the sub-systems (SUBSYS) 19 and 20.

Figure 4:
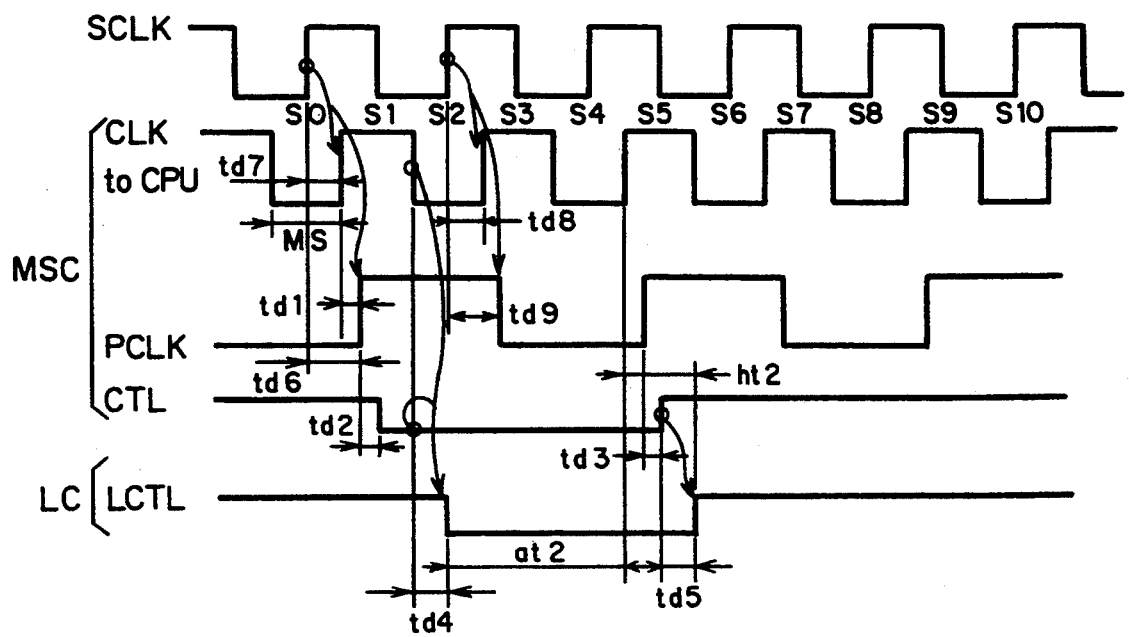
FIG. 4 illustrates generation function of a control signal in the present invention.

On the other hand, in FIG. 4, an equivalent generation function of the control signal to that of FIG. 3 is attained in the embodiment shown in FIG. 1. However, this embodiment differs from the prior system in that the machine state controllers (MSC) 3 and 13 do not operate with reference to the clock (CLK) 6 supplied to the CPU 4, but operate with reference to the phase-advanced system clock (SCLK) 2. For simplification purpose, it is assumed that FIG. 4 shows the operation timing of the machine state controller (MSC).

After the system clock (SCLK) 2 has been supplied to the machine state controller (MSC) 3, the delay thereof is controlled by the machine state controller (MSC) 3 so that the reference clock (CLK) 6 delayed by td 7 is generated. Where the relative delay control between the output signals is necessary as it is in the present system, it is usually necessary to implement the machine state controller (MSC) 3 by an IC so that there is no substantial variation among the delays of gates which constitute the circuit of the machine state controller (MSC) 3.

In the present invention, the distributedly arranged machine state controllers (MSC) are implemented by an IC. By the currently available IC manufacturing process, it is possible to control the relative delay difference between the signals produced from the same type of IC's by the number of pass-through gates. In this manner, the machine stage controller (MSC) 3 operates with reference to the system clock (SCLK) 2 and the CPU 4 operates with reference to the clock (CLK) 6. Thus, the relative delay time of the reference signal PCLK to the clock (CLK) is td 1=td 6−td 7 (where td 6 is the delay time of the signal PCLK to the clock SCLK). Since td 6 itself is the delay time relative to the clock (CLK) in the prior system, it is possible in the present system to output the reference signal PCLK by td 7 earlier than the prior system. Where it is necessary that the signal PCLK is delayed by td 1 (td 1>0) relative to the clock (CLK) because of a relative relationship between the signals, the machine state controller (MSC) 3 controls the delay in the IC built therein so that the required relative delay relationship is attained. Similarly, the control signal CTL is delayed by td 1+td 2 relative to the rise of the clock (CLK) in the state 0 (S0). In the prior system, the delay time is td 6+td 2. According to the present invention, the delay time is reduced by td 7 (because td 1=td 6−td 7) and the control signal (CTL) falls (active LO) earlier by that time. As a result of the reduction of the delay times, it is possible to render the control signal (CTL) active (LO) during the period of the state 1 (S1), and to latch the control signal (CTL) at the rise of the state 1 (S1). Assuming that the delay time until the local control signal (LCTL) is produced from the local controller (LC) 5 is td 4 as it is in the prior system and that read timing of the CPU 4 to read data from the sub-system is the rise timing of the state 4 (S4) as it is in the prior system, an effective access time to the sub-system (SUBSYS) 5 is at 2=3 states −td 4. This means that the access time which is one state longer than that in the prior system is assured. The hold time ht 2 is also shorter because the control signal (CTL) rises (non-active) td 7 earlier. Namely, ht 2=ht 1−ht 7 and the next access cycle may be started after the state 6 (S6). Thus, the access cycle may be reduced by one state time compared to the prior art system of FIG. 3.

The need for two machine state controllers for processing the signals because the total delay time exceeds one machine state as it is in the prior system frequently occurs as the machine cycle frequency goes up. There are many cases where the machine cycle frequency cannot be increased because of this problem. In accordance with the present invention, since the delay time to the reference clock is reduced, the system can be operated at a higher machine cycle frequency.

In the embodiment of FIG. 1, the local controller (LC) is provided independently from the machine state controller (MSC). In the present configuration, a plurality of local controllers (LC) are arranged in combination in each of the local control blocks (LCB) and they are controlled by one machine state controller (MSC). Accordingly, a flexible circuit configuration may be structured in designing an electronic circuit board and hence the flexibility is enhanced. However, where the functions of the local control blocks (LCB) are defined and there is no need for future change, the machine state controller (MSC) and a portion of or entire peripheral local controllers (those portions which have no need for circuit modification) controlled by the machine state controller (MSC) may be integrated in one IC chip. An effect thereof is explained with reference to FIG. 5.

In FIG. 5, the same function as that of the prior system shown in FIG. 3 is attained as it is in FIG. 4. However, this embodiment differs from the example of FIG. 4 in that the local controller (LC) 5 and the machine state controller (MSC) 3 are built in one chip. Otherwise, it is identical to the embodiment of FIG. 1 and the condition set in FIG. 4. Since the local controller (LC) 5 is included in the IC of the machine state controller (MSC) 3, the internal control signal (INCTL) for the identical function in the IC may be used by the local controller (LC) 5 as the control signal (CTL). Since the internal control signal (INCTL) changes at an earlier time than the external control signal (CTL) (that is, the information is available earlier than CTL by the delay time td 13 of the output buffer), the control in the IC may be attained by the internal clock (MSCINCLK) in the IC which changes at an earlier time than the clock (CLK) supplied to the CPU 4 (that is, which is advanced in phase). Assuming that the internal clock (MSCINCLK) changes earlier than the clock (CLK) by the time td 10, the relative delay time of the local control signal (LCTL) to the clock (CLK) is td 4'=td 4−td 10 even if the time td 4 from the rise of the internal clock (MSCINCLK) in the state 1 (S1) to the activation of the local control signal (LCTL) is the same as the delay time in FIG. 4. (In actual practice, td 4 is usually smaller than the delay time in FIG. 4 because the gate delay is smaller when the circuit is constructed only in the IC). Accordingly, the local control signal (LCTL) can be changed earlier when the local controller (LC) is built in the IC than when logic circuit is externally constructed. As a result, the access time at 3

(=at 2+d 10) can be the time td 10 longer than that of the example of FIG. 4 so that a larger margin to access the sub-system (SUBSYS) is assured and the system may be operated at a higher machine cycle frequency. The same is true for the hold time ht 3. Since the internal control signal (INCTL) rises (non-active) at a time td 13 earlier than the external control signal (CTL) does, the local control signal (LCTL) which is generated by using the internal control signal (INCTL) is generated with the relative delay time td 5′ (=td 5−td 13) to the external control signal CTL. Accordingly, the hold time is ht 3=ht 2−td 13, which is smaller than that of the embodiment of FIG. 4 by the time td 13. If the hold time ht 3 is within one state, the next access cycle may be started from the fall of the state 5 (S5).

The above operation and effect are attained by supplying at least the reference clock (SCLK) in advance to the machine state controller (MSC) and driving the CPU by the reference clock (CLK) adjusted in the machine state controller (MSC). However, where one machine state controller (MSC) controls all local controllers (LC) as shown in FIG. 6(b), the following problems are encountered.

1) Since the load to the reference clock (CLK, PCLK) and the control signal (CTL) are heavy (in FIG. 6(b), three local controllers (LC) are connected to each signal line (CLK or CTL)), the delay time of the signal increases.

2) Since the signal lines of the reference clock (CLK, PCLK) and the control signal (CTL) are long, the delay control and the waveform control of many signal lines (in order to electrically suppress the affect produced by the reflection of the signals and the ringing due to the inductive components of the lines) are required.

The above problems cause the reduction of the system operation frequency and the reliability of the system. Accordingly, in the present invention, the distributed machine state control system having a system configuration as shown in FIG. 6(a) is used. In this configuration, one or more machine state controllers (MSC) are provided for each local controller (LC) or a local controller (LC) which is located in the local control block (LCB) so that the load is distributed. The only signal which is the subject of the delay control or the waveform control in the present system is the reference clock SCLK. Thus, the loads to the reference clock (CLK, PCLK) generated by the machine state controller (MSC) and the control signal (CTL) are also distributed, and the problem of the signal delay by the load is relieved. As the system expands, the physical control area expands and the range of distribution of the local controllers (LC) also expands. As a result, assuming that one machine state controller (MSC) controls a plurality of local controllers (LC), it is practically impossible to integrate the machine controller (MSC) and the respective local controllers (LC) in one IC chip. As a result, it is difficult to attain the effects shown in FIGS. 4 and 5. However, in accordance with the distributed machine state control system of the present invention, they may be integrated in one chip for each local control block, and the effects shown in FIGS. 4 and 5 can be readily attained.

The local control block (LCB) is constructed by combining sub-systems or signal controllers (LC, MSC) having a strong signal relation, or combining adjacent circuits in layout, into one. It is preferable that the exchange of signals between local blocks is as small as possible.

Figure 7:
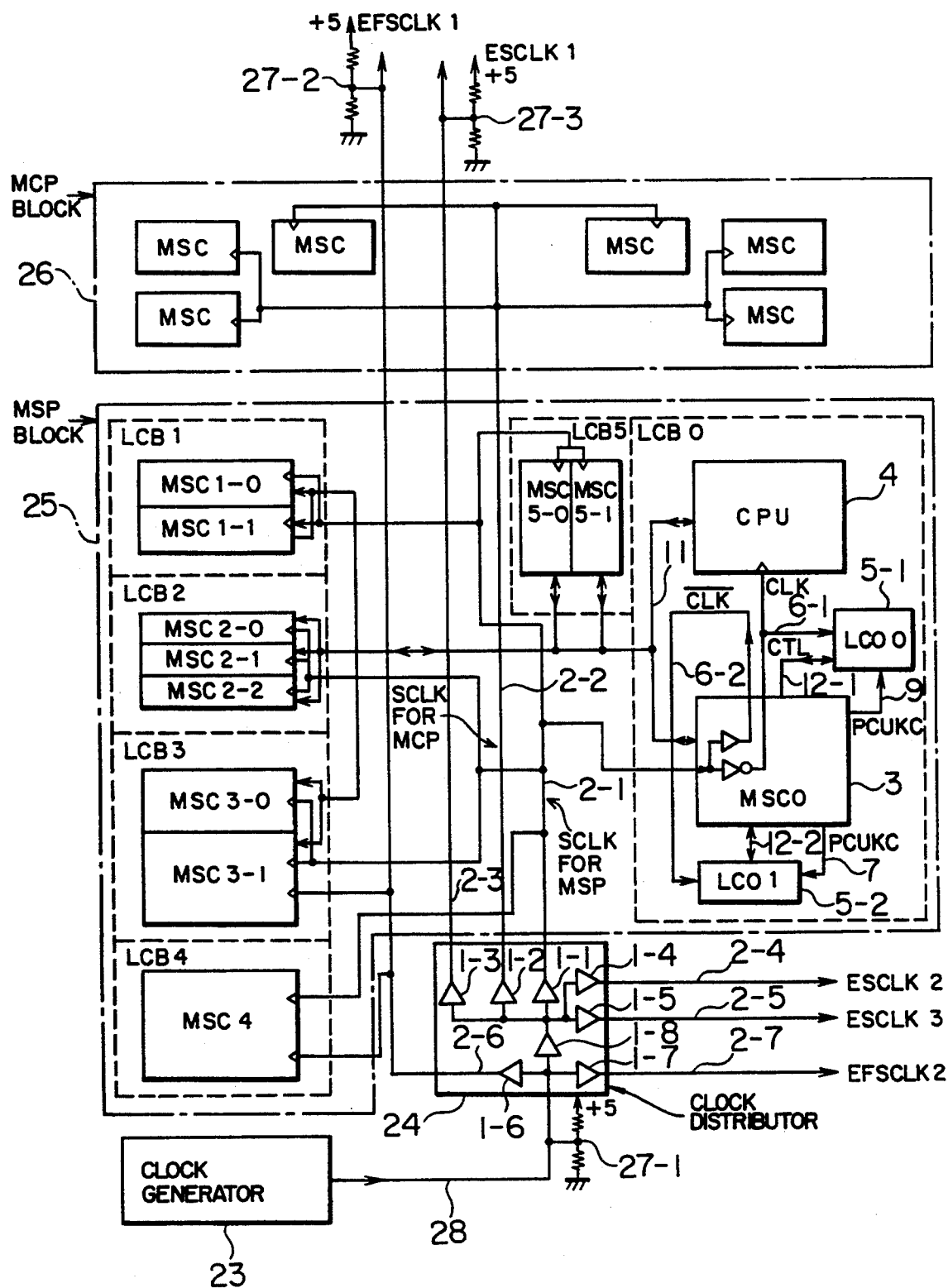
FIG. 7 shows an embodiment of the present invention applied to a large scale system.

FIG. 7 shows an embodiment which applies the distributed machine control system of the present invention to a large scale system. The present embodiment comprises two major processor blocks MCPBLOCK 26 and MSPBLOCK 25. Each processor block has several local control blocks, and each local block includes one or more machine state controllers (MSC). In FIG. 7, only the internal configuration of MSPBLOCK 25 is shown in detail.

A clock generator 23 generates a source clock signal which is used as a reference in the system. The clock signal is transmitted to a clock distributor 24 through a signal line 28, and various system clocks which are used as reference clocks in the system are generated in the clock distributor 24. The system clocks are classified into two major categories, one being fast SCLK (FSCLK) which changes at the earliest time, and the other being SCLK clock which is slightly delayed relative to FSCLK. In FIG. 7, 2-6 (EFSCLK 1) and 2-7 (EFSCLK 2) are shown as the FSCLK, and 2-1, 2-2, 2-3, 2-4 and 2-5 are shown as the SCLK. Of those, SCLK 2-1 is the reference system clock which is exclusively used by the MSPBLOCK. SCLK 2-1 (ESCLK 1), SCLK 2-4 (ESCLK 2) and SCLK 2-5 (ESCLK 3) are the reference system clocks which are externally supplied. The FSCLK includes 2-6 and 2-7 (EFSCLK 2). The FSCLK 2-7 is externally supplied, and FSCLK 2-6 is used by the MSPBLOCK 25 and then externally supplied as EFSCLK 1. Numerals 27-1, 27-2 and 27-3 denote terminating resistors which adjust the impedances of the signal lines to stabilize the transmission of the signal. The clock distributor 24 has a clock driver 1-1 (which outputs SCLK 2-1), a clock driver 1-2 (which outputs SCLK 2-2), a clock driver 1-3 (which outputs SCLK 2-3), a clock driver 1-4 (which outputs SCLK 2-4), a clock driver 1-5 (which outputs SCLK 2-5), a clock driver 1-6 (which outputs SCLK 2-6) and a clock driver 1-7 (which outputs SCLK 2-7). The clock drivers 1-1 to 1-5 are driven by a driver 1-8, and the clock drivers 1-6 and 1-7 and the driver 1-8 are directly driven by the clock signal line 28 from the clock generator 23. Accordingly, SCLK 1-1 to 1-5 are delayed relative to FSCLK 1-6 and 1-7 by the time required to pass through the driver 1-8. This delay time is adjusted in the clock distributor so that a system clock having two distinctive delay stages relative to the reference clock (CLK) supplied to the CPU is generated. In principle, the system clock having any number of phase difference stages can be generated in the same manner. By properly selecting the system clocks and supplying them to the machine state controllers (MSC) of the local control blocks (LCB), it is possible to attain a finer control to the relative delay. In the embodiment of FIG. 7, FSCLK 2-6 is supplied to the MSC 3-1 of the LCB 3 and the MSC 4 of the LCB 4. As a result, the MSC 3-1 and the MSC 4 can supply the necessary control signals at an earlier timing than other machine state controllers (MSC).

The MSPBLOCK comprises six local control blocks LCB 0–LCB 5. The LCB 0 includes the CPU and has one machine state controller MSC0 and two local controllers LCO0 5-2 and LCO1 5-2 which cannot be built in the MSC0 or which do not provide particular advantage in being built-in. The MSC0 generates a clock CLK 6-1 which is to be supplied to the CPU and serves as the reference of the overall MSPBLOCK, an inverted clock CLK 6-2 and auxiliary reference signals PCLK 7 and PCLK 9. In other local control blocks LCB 1–LCB 5, those local control functions which can be built in the machine state controller (MSC) are built in the MSC so that the effect of the AC timing explained in FIGS. 4 and 5 are effectively utilized. Since the LCB0 includes the CPU which is the heart of the system, it is a block which serves as the reference of the operation timing of the system. For simplification only the machine state controllers (MSC) are shown in the local control blocks LCB 1-5. Each local control block (LCB) includes one or more machine state controllers (MSC), including a local controller (LC) having the necessary control function. The local controller (LC) shown in FIG. 5 is implemented by an IC together with the machine state controller (MSC) so that the effect of the AC timing is attained and the system operation at a high machine cycle is permitted. The system clocks 2-1 and 2-6 distributed by the clock distributor 24 are supplied to each local control block (LCB). Those system clocks are controlled for signal skew so that the arrival times to the respective machine state controllers (MSC) are defined to some extent. (Normally, the simultaneous arrival is preferable, but in some instances a clear definition of a relative relation of the signal arrival times may be sufficient.) As explained above, the system clock 2-6 changes a little earlier than the system clock 2-1 does. The system clock 2-1 is supplied to the LCB0, LCB1, LCB2 and LCB5, and the system clock 2-6 is supplied to the LCB-3 and LCB-4. Accordingly, the control signals in the LCB 3 and LCB4 may be generated a little earlier than the control signals in other local control blocks (LCB) so that a the critical AC timing control in the local control blocks (LCB) or system is attained. A signal line 11 for exchanging the minimum required control signals with the CPU of the LCB0 is connected to the machine state controllers (MSC) of the LCB1–LCB5 so that the necessary control signals are generated in the respective local control blocks (LCB) based on the information on the signal line 11 in accordance with the system clock. The control signals generated in the respective local control blocks (LCB) are used in the respective local control blocks as a rule, but those signals which do not pose a serious problem even if the signal line is extended may be supplied from other local control blocks (LCB) or sent to other local control blocks (LCB). Thus, some signals are exchanged between the local control blocks (LCB)

In accordance with the present invention, in the large scale system as shown in FIG. 7, the operation frequency can be raised, the length of the critical signal line can be shortened and the load of the critical signal line can be reduced. This leads to electrical stability and a higher reliability of the system, and also reduces the delay due to the time constant circuit in the wiring and the absolute delay (which is physically determined by a light velocity) of the signal line, and further raises the operation frequency (or shortens the machine cycle).

Embodiments of a preferred embodiment of processor system according to the present invention now will be explained.

Figure 8:
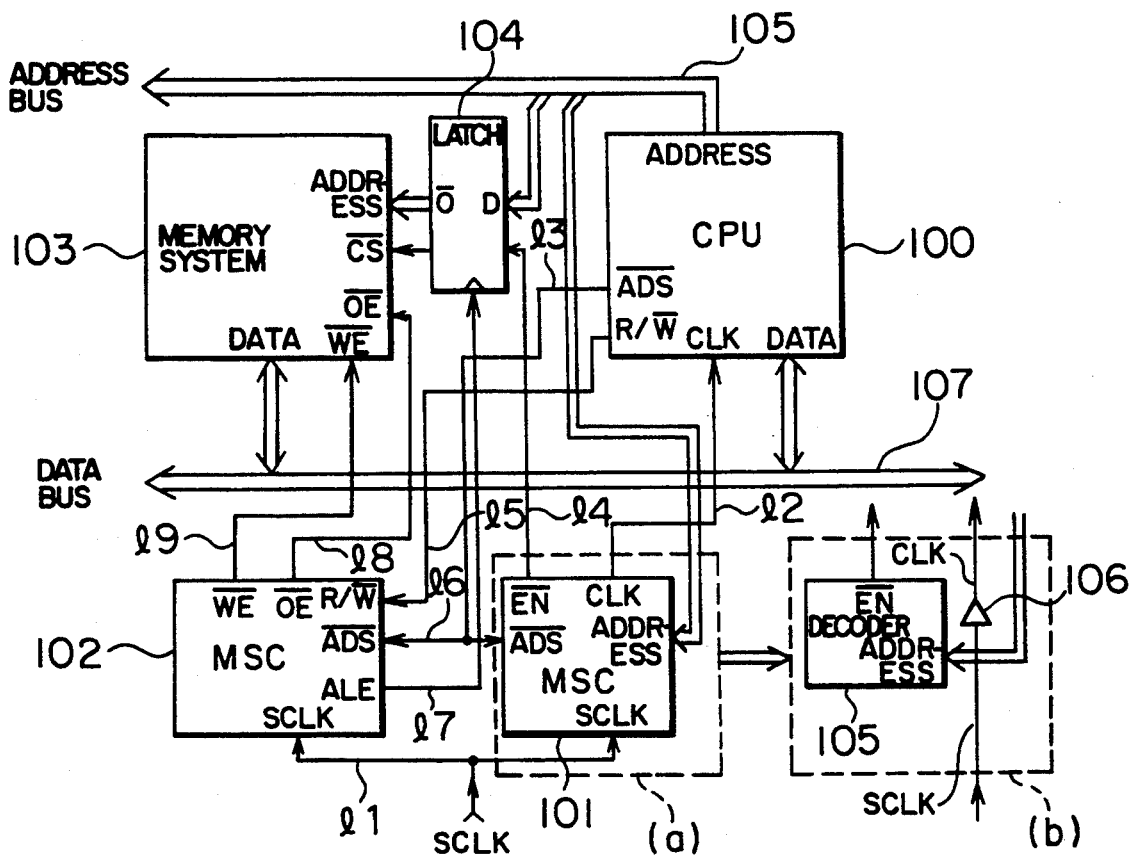
FIG. 8 shows other embodiment of distributed machine state controlled system of the present invention.

FIG. 8 shows a distributed machine state controlled system which comprises a memory system 103, a machine state controller 102 which operates to control the memory system 103, and another machine state controller 101 which controls a CPU 100. In the present embodiment, the machine state controller 101 has a role of supplying a basic clock CLK 12 generated from the system clock SCLK 11 to the CPU 100, and a role of generating an enable signal EN 14 which permits access to the memory by using the signal on the address bus 105. If the EN 14 and CLK 12 are generated by flow-through logic, they have no connection with the machine state, and the function of the portion (a) may be attained by a clock driver 106 having a delay control function and a decoder 105 as shown in (b). In this case, the machine state control is not necessary. The machine state controller MSC 102 supplies necessary control signals to the memory system 103. The CPU 100 supplies to the machine state controller MSC 102 a control signal ADS 13 which is used as a reference to determine the state of the CPU 100 and a signal R/W 15. Based on those signals and a system clock SCLK 11, control signals DE 18 and WE 19 for controlling the memory system 103 are generated. An address latch signal ALE 17 is supplied to a latch circuit 104 which latches the necessary address information to the memory system 103 from the address bus 105. In the present embodiment, the latch circuit 104 also latches the signal EN 14. Since the ALE 17 may be generated in the MSC 101, it may be generated in the latch circuit 104 in the MSC 101. Alternatively, the address 105 may be supplied to the MSC 102 which has the function of generating the EN 14 and latching the address to be supplied to the memory system. In this case, since the whole local controller is incorporated in the MSC 102, the necessary control signals and address signals can be supplied to the memory system 103 at an earlier timing in the way described above so that the access time to the memory is improved.

Figure 9:
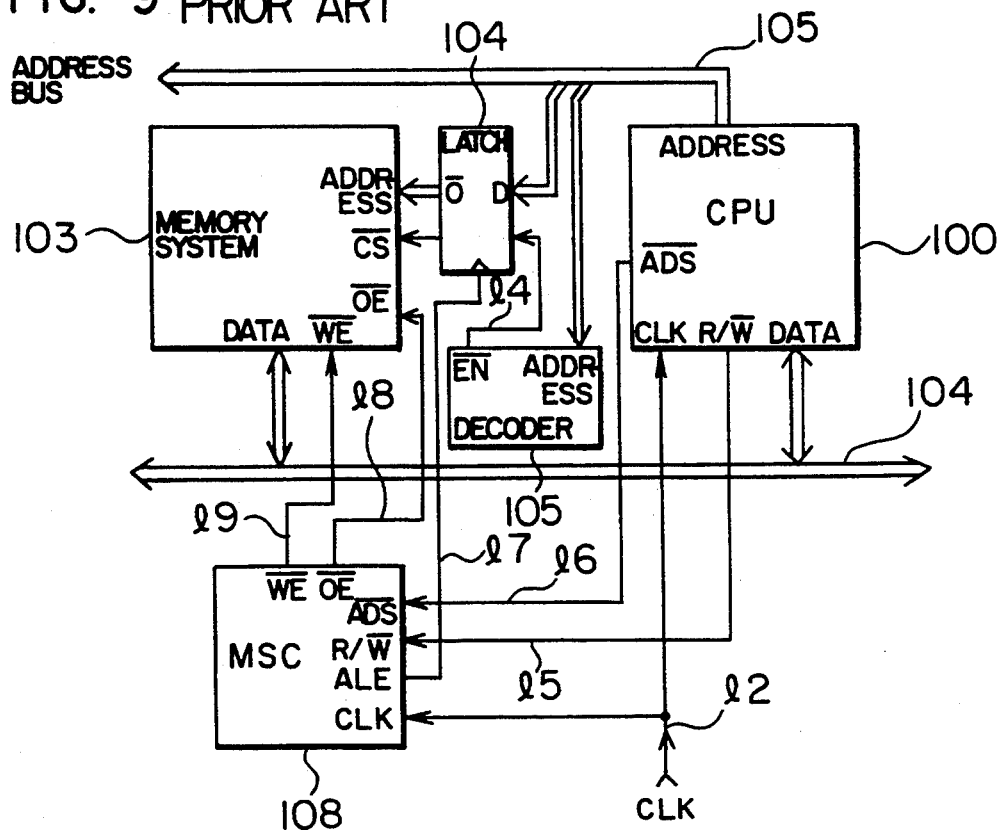
FIG. 9 shows a prior art processor.

FIG. 9 shows a prior art processor system. The CLK 12 is supplied, as a basic clock, to the CPU 100 and the machine state controller MSC 108. The EN 14 is generated by the decoder 105 and it is latched by the latch circuit 104 together a necessary address, and they are supplied to the memory system 103. Functionally, this system is equivalent to the processor system shown in FIG. 8 but it is inferior to the system of FIG. 8 in securing the access time to the memory, as described above. Detailed timings and a comparison thereof will be explained later.

Figure 10:
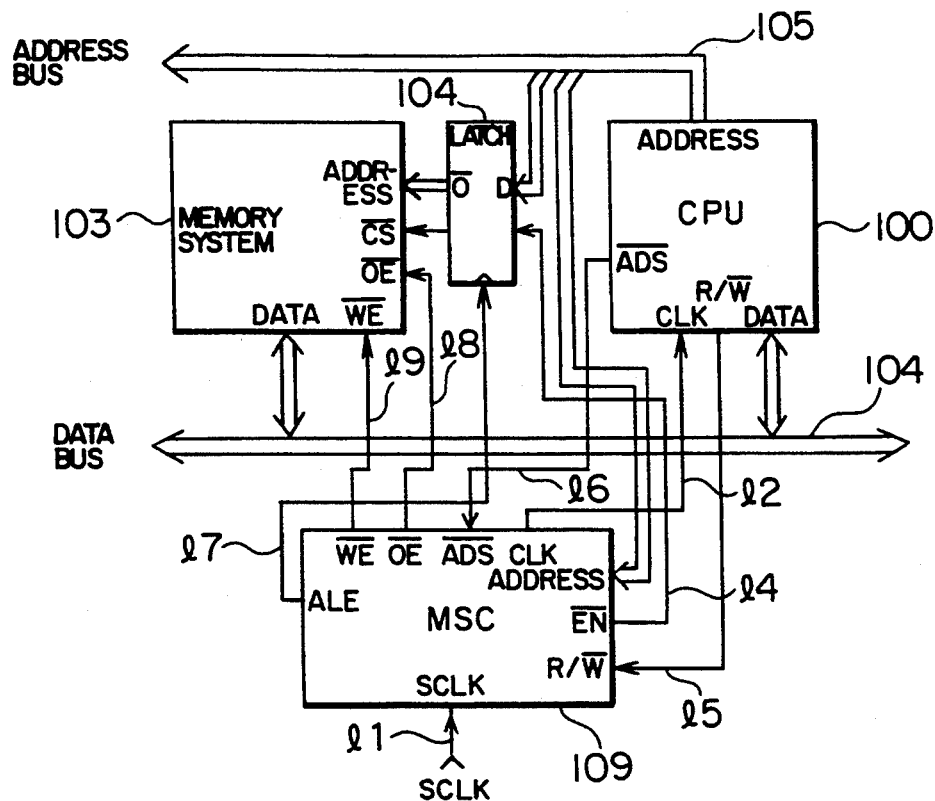
FIG. 10 shows an embodiment which combines two machine state controllers shown in FIG. 8 into one.

In FIG. 10, two machine state controllers MSC 102 and MSC 101 shown in FIG. 8 are consolidated into one machine state controller MSC 109. If the MSC 109 is embodied in one IC chip, it is possible to more precisely adjust the phase relationship and the output timing of the CLK 12 which is the basic clock to the CPU 100, and the reference control signals ALE 17, OE 18 and WE 19 to the memory system 103 and the latch circuit 104. Since a variance of the switching speed between transistors in one IC chip is very small, the adjustment of the delay between the signals can be finely adjusted so that more critical timing design is attained. By building the latch circuit 104 in the MSC 109 as it is in FIG. 8, the reference control signals and the address signal may be supplied to the memory system 103 at an earlier timing than the reference clock CLK 12.

Figure 11:
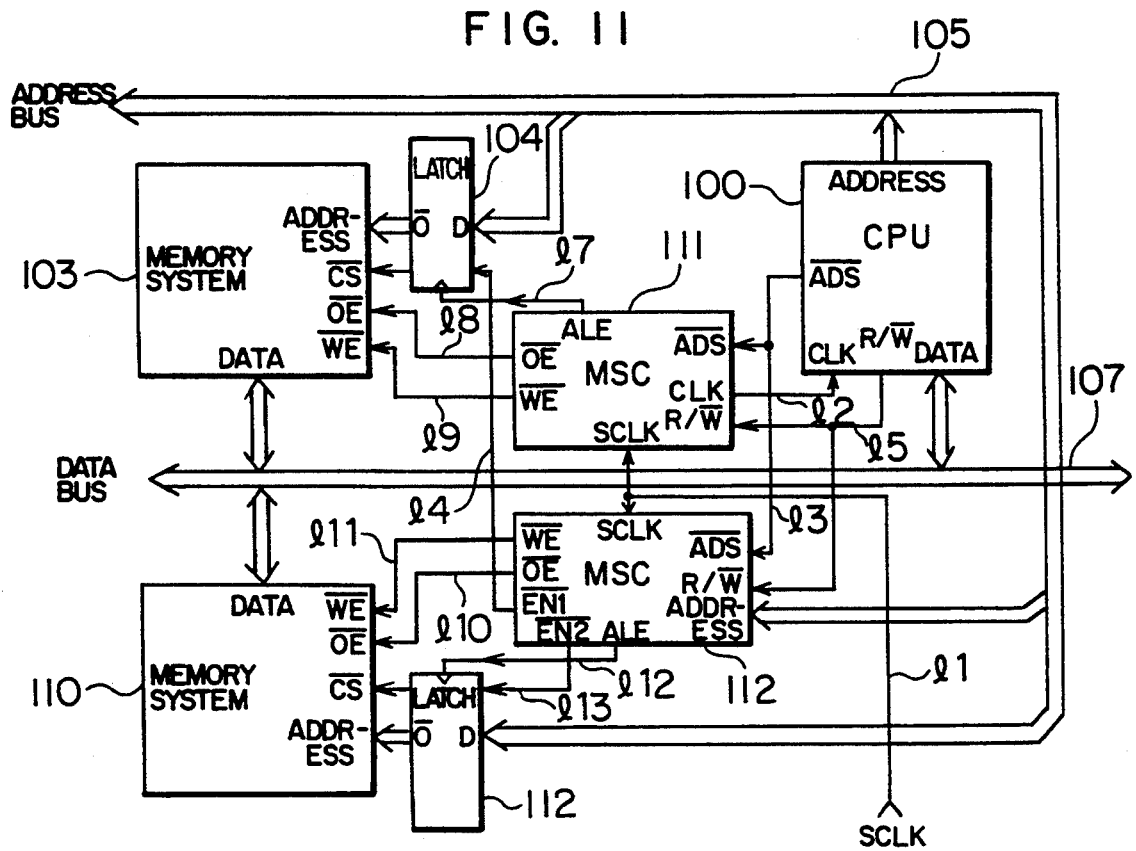
FIG. 11 shows an embodiment which includes the processor system shown in FIG. 10 and an additional memory system.

In FIG. 11, a memory system 110 is added to the processor system of FIG. 10 and a machine state controller MSC 112 which controls the memory system 110 is provided in a distributed manner. In the present embodiment, both the enable signal $\overline{EN1}$ 14 which permits the access to the memory system 103 and the enable signal $\overline{EN2}$ 113 which permits the access to the memory system 110 are generated by the MSC 112. Accordingly, necessary address information is supplied to the MSC 112 from the address bus 105 and it is used for decoding. As the memory system expands, the load of the control signals and the address signals also increases (because the number of memory IC's increases). By distributing the load by using the distributed machine state control of the present invention, the delay of the timing can be reduced. This has been discussed in detail before. In the present embodiment, the MSC 111 is allotted to the memory system 103 to supply the control signal ALE 17, OE 18 and WE 19 thereto, and the MSC 112 is allotted to the memory system 110 to supply the control signals ALE 112, OE 110 and WE 111 thereto. If the memory systems 103 and 110 are of the same scale, the delay of the control signals relative to the reference clock CLK 12 to the CPU 100 is substantially the same as that in FIG. 10, and there is no substantial increase of the delay of the timing due to the load.

The delay of the control signals produced by the respective MSC's relative to the reference clock CLK when the distributed machine state control is used is now considered and it is compared with that of the prior art system to clarify the advantages.

FIGS. 12 to 16 show minimum, typical and maximum signal delays for various conditions of surrounding temperature, power supply, load and process in the distributed machine state control which uses a plurality of MSC's implemented by CMOS IC's. FIG. 12 shows that the process variation is 40% in a standard environment of 25° C., 5 V and 30 pF. In a standard model having a delay (a) of the CLK relative to the SCLK set to 3 ns and a delay (b) of the control signal relative to the SCLK set to 6 ns, a minimum delay (c) of the control signal relative to the CLK is 0.08 ns, a typical delay is 3 ns and a maximum delay is 6.26 ns. In the prior art system, the maximum delay is 8.4 ns. Accordingly, at least a 2.14 ns improvement of the timing is offered by the present invention. Similarly, in a worst environment of 55° C., 4.8 V, 30 pF and process variation of 40%, at least a 2.4 ns improvement of the timing is assured by the present invention.

In the above examples, the process variation is worst. It is possible by the currently available process control to suppress the process variation to less than 15% by eliminating 10% of the extremely high speed IC chips and 10% of extremely the low speed IC chips or manufacturing all MSC's in one lot. FIG. 14 shows a result for such a case. The delay (c) of the control signal relative to the CLK is 4.81 ns at longest, and the control within 5 ns is attained. Further, at least 2.92 ns improvement of the timing compared to the prior art system is assured. When the reference clock CLK is supplied to the CPU by the MSC which has the typical delay, a result shown in FIG. 15 is obtained. The delay (c) of the control signal relative to the CLK is 4.37 ns at longest, and so a 3.36 ns improvement of the timing compared to the prior art system is attained.

In FIG. 16, the phase relationship between the reference clock CLK to the CPU and the control signal is determined such that the delay of the control signal relative to the CLK is 0 ns at a minimum by controlling the delay of the CLK relative to the SCLK. The condition is the same as that in FIG. 15, but the timing is further improved to 5.04 ns and the delay (c) of the control signal relative to the CLK is 3.35 ns at maximum, which is best among the above examples. In an actual system, the design is made under the condition shown in FIG. 16.

FIGS. 17 and 18 show the delays (c) of the control signal relative to the CLK in the prior art system. In FIG. 17, the condition is 55° C., 4.8 V, 30 pF load and the process variation of 40%. In FIG. 18, the condition is 55° C., 4.8 V, 30 pF load and the process variation of 15%.

Figures 19A, 19B:
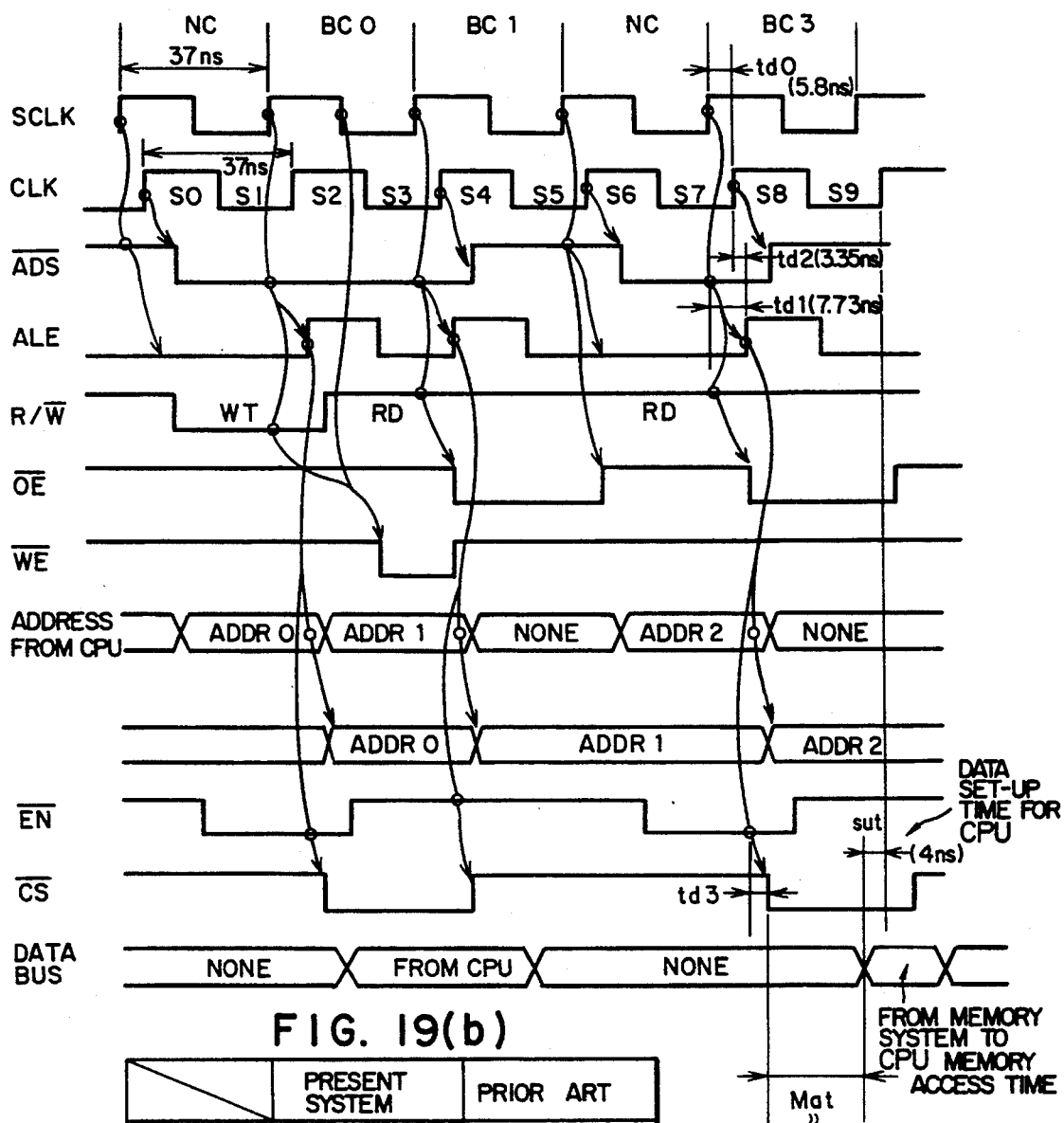
FIG. 19(a) shows a waveform diagram of the present invention.
FIG. 19(b) is a table showing a comparison of the present system to the prior art.

FIG. 19 shows a timing of the reference clocks and the control signals in the embodiment shown in FIG. 8. A signal ADS 13 ($L_0$ active) indicates whether the CPU 100 is to execute a bus cycle (BC) in the next clock period. It is generated by the CPU 100. The bus cycle is completed in one clock (which corresponds to one CLK cycle). The SCLK 11 and the CLK 12 have the same frequency and they are relatively controlled for the delay under the condition shown in FIG. 16. The worst condition is assumed. The CPU 100 produces, in a CLK period which is one cycle prior to a cycle to start the bus cycle (BC), the address 105 to be used in the bus cycle, the control signal R/W 15 (which is $L_0$ in the write mode) indicating a read cycle or a write cycle, and the ADS 13. The bus cycle control which produces the data necessary for the access one cycle earlier is called a pipeline bus cycle, which will most probably be used in microprocessors which require a high speed bus cycle.

In FIG. 19($a$), the bus cycle BC0 is a write cycle. The machine state controller MSC 102 produces, in the bus cycle BC0, a write enable signal WE 19 ($L_0$ active) for the memory system 103 based on the ADS 13, the R/W 15 and the SCLK 11. In the memory cycle BC1, the enable signal EN 14 to the memory system is non-active (High level) and no access to the memory system 103 is effected. The bus cycle BC3 is a read cycle. Data is fetched to the data bus 107 from the memory system 103 and it is read into the CPU 100 at the rise of a state S9. Since this read cycle is most critical from the standpoint of access timing, the present example is compared with the prior art system.

Since the address latch enable signal ALE 17 is generated in parallel with the generation of the CLK 11 with reference to the SCLK 11, the relative delay (td 2) from the CLK 11 is 3.35 ns at maximum. Assuming that a maximum delay time (td 3) by the latch circuit 104 is 5 ns, a total delay time (td 2+td 3) relative to the CLK 12 before a chip select signal CS which activates the memory system 103 (ready to access) and the address signal to the memory system 103 are set is 8.35 ns. Since a data set-up time (SUT) necessary for the CPU 100 to latch the data fetched from the memory system 103 is 4 ns, the time available as the access time to the memory system 103 is 24.65 ns assuming that the period of the CLK 12 is 37 ns, as seen in FIG. 19($b$). On the other hand, in the prior art system, since the ALE 17 is generated for the CLK 12, the total delay time before the signal CS and the address to the memory system 103 are set is 12.73 ns (7.73ns+5ns), and the available memory access time is 20.27 ns which is 4.5 ns shorter. A signal OE 18 indicates whether the data from the memory system 103 is to be supplied to the data bus 104 (the data is supplied when t is low). It is assumed that the signal OE 18 is set sufficiently early so that it does not affect to the access time.

The improvement of 4.5 ns corresponds to 12.2% for the machine cycle of 37 ns. It represents a very big amount in a high speed CPU. In other words, when a memory system having an access time of 25 ns is used, a machine cycle of 37 ns is attained by the present system, but a machine cycle of 41.5 ns is attained in the prior art system. Thus, the system performance is improved by 12.2%.

In accordance with the present invention, the peripheral control circuits and the bus controller are implemented by IC's and they are controlled by the clocks which are advanced relative to the clock supplied to the CPU, and the clock supplied to the CPU is also generated in the IC with delay control. Accordingly, the delay time of the control signals generated to control the peripheral system relative to the clock supplied to the CPU is reduced.

I claim:

1. A distributed machine state controlled processor system, comprising:
   a CPU including means for supplying a first access control signal representing an internal state regarding access from said CPU;
   a subsystem connected to said CPU so as to be accessed by said CPU;
   a machine state controller connected to said CPU, responsive to receipt of a system clock signal for supplying a reference clock signal, delayed relative to said system clock signal, to said CPU for controlling an operational state of said CPU, and responsive to said first access control signal, initiated during a first state of operation of said reference clock signal, and to said system clock signal for supplying a second access control signal, initiated during a second state of operation of said reference clock signal;
   a signal controller connected to said subsystem and further connected to said machine state controller to receive said second access control signal, said signal controller responsive to said second access control signal for generating a third access control signal, initiated during a third state of operation of said reference clock signal to enable access to said subsystem so that said subsystem is enabled when accessed by said CPU.

2. A distributed machine state controlled processor system according to claim 1, further comprising:
   a second subsystem connected to said CPU so as to be accessed by said CPU;
   a second signal controller connected to said second subsystem; and
   a second machine state controller connected to said CPU and said second signal controller, responsive to receipt of said system clock signal and said first access control signal for supplying a fourth access control signal to said second signal controller;
   said second signal controller responsive to said fourth access control signal for generating a fifth access control signal to control access of said CPU to said second subsystem.

3. A distributed machine state controlled processor system according to claim 2, wherein said second subsystem, said second machine state controller and said second signal controller are arranged proximate to one another.

4. A distributed machine state controlled processor system according to claim 1, wherein said machine state controller and at least a circuit portion of said signal controller are incorporated in one IC chip.

5. A distributed machine state controlled processor system according to claim 1, wherein said machine state controller includes means for controlling said delay of the reference clock signal with respect to said system clock signal.

6. A distributed machine state controlled processor system according to claim 1, further comprising a source clock generator and clock distribution means including at least one clock driver receiving a source system clock signal from said source clock generator for supplying said system clock signal at least to said machine state controller.

7. A processor system comprising:
   a data bus;
   a system clock generator for supplying a system clock signal;
   a first data input/output device connected to said data bus;
   a CPU connected to said data bus and including means for supplying an access state signal representing an internal state for access operation by said CPU
   an input/output controller responsive to a reference control signal for supplying an access control signal to said data input/output device to thereby control a data input/output operation between said input/output device and said CPU during an execution state of said CPU in which said CPU exchanges data with said input/output device to execute a desired process; and
   a first machine state controller, including means for receiving said system clock signal from said system clock generator and for generating a reference clock signal delayed relative to said system clock signal and means responsive to said access state signal from said CPU and said system clock signal for generating said reference control signal;
   said CPU responsive to said reference clock signal for accessing said data input/output device and initiating said access state signal.

8. A processor system according to claim 7, wherein said input/output controller is included in said first machine state controller.

9. A processor system according to claim 8, wherein said first machine state controller includes means responsive to said system clock signal for generating the reference clock signal, means responsive to said access state signal and said system clock signal for generating the reference control signal, and means for receiving access information from said CPU to access data in said data input/output device.

10. A processor system according to claim 8, wherein at least a portion of said input/output controller and said first machine state controller necessary for input/output device access control are integrated in one IC chip in order to form a state machine for controlling the input/output device access.

11. A processor system according to claim 8, further comprising distributed loads of elements connected to receive said reference control signal.

12. A processor system according to claim 7, further comprising:
   a second input/output device connected to said CPU;
   a second machine state controller connected to said CPU and responsive to said system clock signal and said access state signal for supplying a second access control signal; a second input/output controller connected to said CPU, said second machine state controller and said second input/output device and responsive to said second access control signal for supplying a local control signal to said input/output device to access data therein.

13. A processor system according to claim 7, wherein said first machine state controller includes means responsive to said system clock signal for generating the reference clock signal, means responsive to said access state signal and said system clock signal for generating the reference control signal, and means for receiving access information from said CPU to initiate access to data in said input/output device.

14. A processor system according to claim 7, wherein the first machine state controller is provided in a single integrated circuit chip.

15. A processor system according to claim 7, wherein said data input/output device includes a memory.

16. A processor system, comprising:
a memory system;
a first machine state controller responsive to a system clock signal inputted therein for generating a reference clock signal delayed relative to said system clock signal;
a CPU connected to said memory system and said first machine state controller and responsive to said reference clock signal for applying an access control signal, initiated during a first access operation state of said reference clock signal, representing an internal state regarding access from said CPU, to said first machine state controller;
said first machine state controller generating a timing signal in response to both said access control signal received from said CPU and said system clock signal; and
a memory access controller responsive to said timing signal for supplying a memory control signal, including address signals and control signals from said CPU, during a second access operation state of said reference clock signal, and for performing a data input/output operation between said memory system and said CPU.

17. A processor system according to claim 16, further comprising a second machine state controller connected to said CPU for generating a second timing signal in response to both said access control signal received from said CPU and said system clock signal, a second memory system connected to said CPU, and a second memory access controller responsive to said second timing signal for supplying a second memory control signal regarding another access from said CPU and responsive to both said system clock signal and said access control signal representing said internal state of said CPU wherein loads of elements connected to receive the reference control signal are distributed.

18. A processor system according to claim 16, wherein said memory system includes an input/output device accessed by said CPU.

* * * * *